INVENTOR
F. K. BOWERS
BY Alan C. Rose
ATTORNEY

INVENTOR
F. K. BOWERS
BY Alan C. Rose
ATTORNEY

DELTA MODULATION COMPANDER

Filed May 16, 1955 3 Sheets-Sheet 3

INVENTOR
F. K. BOWERS
BY Alan C. Rose
ATTORNEY

United States Patent Office 2,897,275
Patented July 28, 1959

2,897,275

DELTA MODULATION COMPANDER

Fritz K. Bowers, Convent, N.J., assignor to Bell Telephone Laboratories, Incorporated, New York, N.Y., a corporation of New York Application May 16, 1955, Serial No. 508,608

9 Claims. (Cl. 179—15.6)

This invention relates to pulse transmission systems, and more particularly to improvements in systems such as delta modulation transmission systems in which the transmitted pulse train represents a derivative of the original signals.

In one simple form of delta modulation, positive or negative pulses are sent from transmitter to receiver at a preassigned rate. The transmitted pulses are applied to identical integrating circuits at the transmitter and the receiver. Prior to the transmission of each pulse, the output from the integrator at the transmitter is compared with the original signals. If the original signal is larger than the output from the integrator, a positive pulse is transmitted to build up the integrator output; while if the original signal is smaller than that from the integrator, a negative pulse is transmitted to reduce the integrator output. Normally, therefore, the output of the integrator at the transmitter deviates from the input signal by less than the magnitude of one pulse. The delta modulation receiver includes a duplicate integrator circuit as mentioned above, followed by a low pass filter to reduce the noise introduced by the pulse form of transmission. The output of the integrator at the receiver is identical with that at the transmitter, and is herefore a good approximation of the original signal under normal conditions. However, when the slope of the amplitude versus time characteristic of the original signal becomes too steep, a delta modulation system of the type mentioned above is overloaded, and substantial distortion is introduced.

Accordingly, the principal object of the present invention is to reduce distortion in modulation systems in which the transmitted pulse train represents a derivative of the original signals.

This object is accomplished in accordance with the present invention by the use of a slope companding circuit in combination with the pulse transmission system. A slope companding circuit comprises the combination of a slope compression circuit located at the transmitter to reduce the slopes of signals prior to encoding and transmission, and a slope expander at the receiver to restore the transmitted signals to their original state. The slope compression circuit may include a differentiator, an instantaneous amplitude compression circuit and an integrator; and the slope expander may include a differentiator, an expander and an integrator. When a delta modulation system which transmits signals representing the second derivative of the original signals is employed, however, a differentiation circuit which differentiates the signals twice is employed at the transmitter, and a double integration circuit may be employed at the receiver.

A feature of the invention is a simplified delta modulation transmission system in which the amount of additional equipment required for slope companding is minimized. This is accomplished at both receiver and transmitter by performing the integration function required in slope companding with the same integrator normally employed in delta modulation, but with the integrator located in a different position in the circuit. In addition, the use of a differentiator at the receiving terminal is obviated by relocating the low pass filter at the input to the reeciver circuit. The resultant signal represents the slope of the original signal which may be directly expanded and integrated.

An advantage of the proposed system is the reduction in transmission bandwidth which may be achieved through the use of the present companding circuits. In delta modulation systems, the bandwidth is proportional to the pulse repetition frequency, and slope companding permits a substantial reduction in this frequency. Accordingly, the bandwidth required by the companded delta modulation system of the present invention is substantially less than that required by conventional delta modulation systems.

Turning to another phase of the development of difference transmission systems, one factor which has retarded the application of delta modulation to multichannel systems is the requirement that the pulse generator and integrator of the delta modulator be closely associated. In view of this requirement, it has generally been considered that a multichannel delta modulation system would require a separate encoder for each channel or a complicated switching arrangement between the pulse generator and the integrators. Therefore, systems such as pulse code modulation systems, in which common coding equipment may readily be employed, have generally been preferred for multichannel pulse transmission.

Accordingly, another object of the present invention is to extend the advantages of delta modulation to multichannel transmission systems.

This is accomplished by the use of a common delta modulation encoder for a multiplex transmission system in which the integration function is preformed by a delay loop. Pulses of varying amplitude circulate in the delay loop, with the amplitudes of successive pulses representing the algebraic sum of the coding pulses transmitted over the corresponding channel. Because the pulse repetition rate may become a limiting factor in multiplex systems, and in view of the reduction in this rate which is permitted by slope companding as noted above, an important feature of the present invention is the use of the slope companding circuits in combination with a multichannel delta modulation system having a common coder.

Other objects, and various additional features and advantages of the invention will become apparent from the following detailed description of illustrative embodiments thereof taken in conjunction with the attached drawings and the appended claims.

In the drawings:

Fig. 1 represents a conventional delta modulation transmission system;

Fig. 2 includes several plots giving characteristics of the circuit of Fig. 1;

Figures 1, 2:
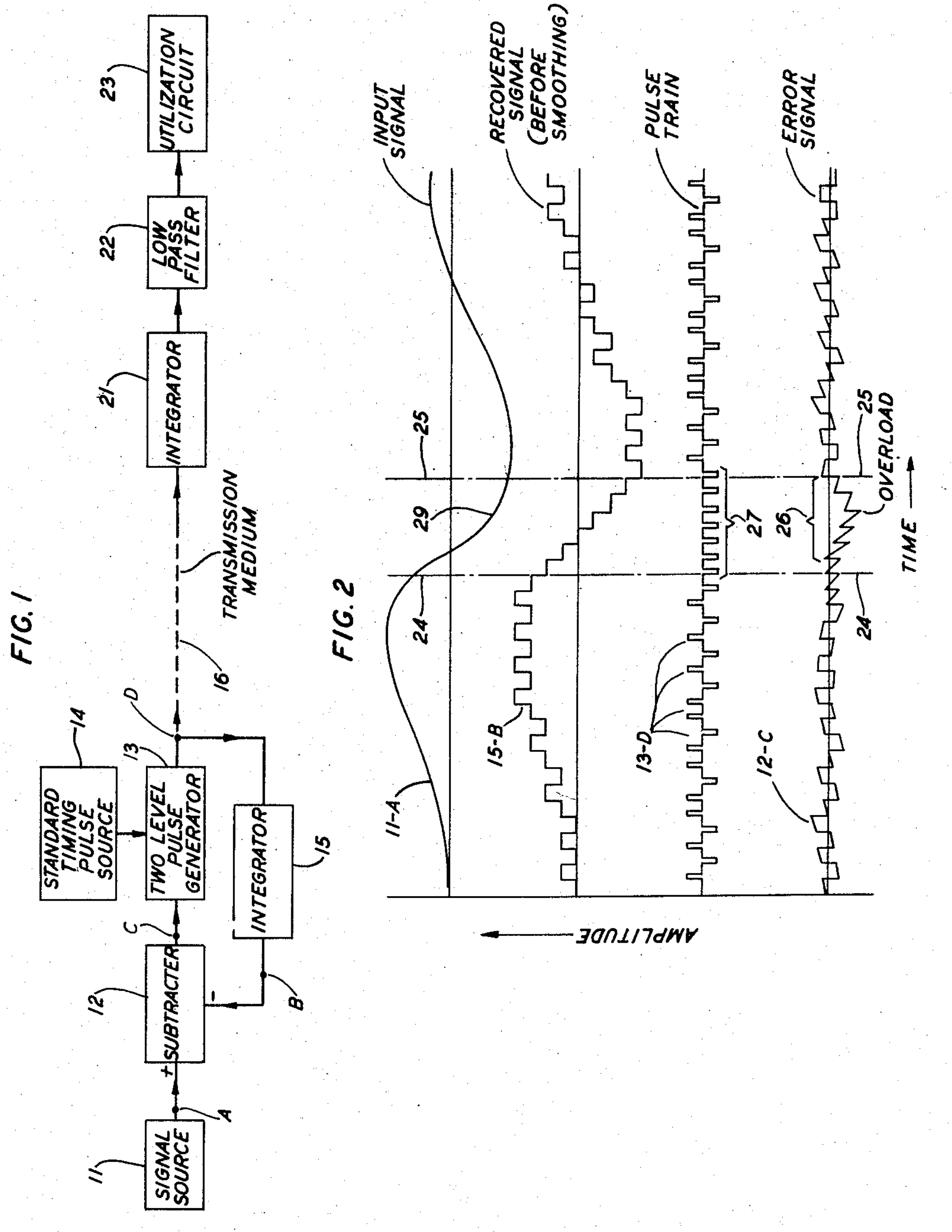

In Fig. 1, a conventional delta modulation transmission system is shown in block diagram form. This type of circuit is well known and is disclosed, for example, in an article by F. de Jager entitled "Delta Modulation," Phillips Research Reports, volume 7, pages 442 to 466, 1952, and in J. F. Schouten et al. Patent 2,662,118, granted December 8, 1953. In Fig. 1, signals from the signal source 11 are applied to the subtracter 12. The output pulses from the two-level pulse generator 13 are synchronized by the standard timing pulse source 14. For example, if the output from the subtracter 12 is positive at the time of the arrival of a pulse from the pulse source 14, the generator 13 produces a pulse having a preassigned level; while if the subtracter output is negative, the generator 13 produces a pulse of a different level, or no pulse at all. In the example shown in Fig. 1, the pulses from the generator 13 are assumed to be positive or negative, respectively, depending on whether the output from the subtracter 12 is positive or negative. The output pulses from the generator 13 are summed in the integrator 15, and the resultant waveform is the second input to the subtracter 12.

The pulses from the generator 13 are transmitted by any suitable transmission medium 16 to a delta modulation receiver. The receiver includes the integrator 21, the low pass filter 22 and the utilization circuit 23, connected in series. The integrator 21 is a duplicate of the integrator 15 associated with the transmitter circuitry. The low pass filter smoothes the stepped waveform at the output of the integrator 15, and thus reduces the noise introduced by the pulse form of transmission.

The operation of the delta modulation transmission circuit may be more readily understood by reference to the plots of Fig. 2. In Fig. 2, the waveform 11–A corresponds to the output of the signal source 11 at point A in the circuit of Fig. 1. The waveform 15–B in Fig. 2 corresponds to the output of integrator 15 at point B. The waveform 12–C corresponds to the output of subtracter 12 at point C. The pulse train 13–D represents the pulse output of the generator 13 at point D, at the transmitter output circuit. The waveform 15–B of Fig. 2 represents the sum of the current pulses produced by the pulses 13–D. Because the pulses 13–D last for only a small fraction of a pulse period, the plot 15–B assumes a stepped waveform. In comparing waveforms 11–A and 15–B, it may be observed that the waveform 15–B at the output of the integrator 15 is a rough duplication of the original input signal 11–A.

The two waveforms 11–A and 15–B are compared in the subtracter 12, and the difference appears at point C. This difference, which is graphically shown in plot 12–C of Fig. 2, determines the sign of the next subsequent output pulse from the generator 13. The pulse train shown at 13–D has a number of positive and negative pulses. In one region, designated 26, of the plot 12–C, the output of the subtracter 12 is negative for a considerable period of time. Accordingly, the pulses from the generator 13 are similarly negative in sign. This region in the pulse train 13–D is designated 27.

For simplicity and ease of portrayal in Figs. 1 and 2, the two-level pulse generator 13 of Fig. 1 has been described as one which produces either positive or negative pulses. In actual practice, however, the pulser 13 would normally either produce a pulse or no pulse at successive time intervals determined by the timing pulse source 14. Thus, for example, if the output from the subtracter 12 is positive, a pulse is produced, while if the output is negative, no pulse is produced. Under these circumstances, the integrator 15 has a negative bias, and, in the absence of pulses, its voltage output decreases in level in one pulse period by an amount equal to the net increase in one pulse period resulting from a positive pulse. The output from the integrator 15 would then be a saw-tooth waveform, but would have the same magnitude as the plot indicated at 15–B in Fig. 2 at the instants of arrival of the pulses from the pulse source 14, when the critical amplitude comparison operation takes place.

Returning to Fig. 2, it may be noted that when the input signal 11–A is gently sloping, the error signal 12–C remains small. However, in steep sections of the curve 11–A such as section 29, between the vertical dashed lines 24 and 25, the error signal can increase to a substantial amount as indicated by portion 26 of plot 12–C. The magnitude of the error signal increases during the time interval when the signal 29 is unduly steep, and the region of greatest overload therefore tends to lag the steepest portions of the input signal characteristic 29. The overload persists even when a continuous train of negative pulses appear, as indicated at 27 at the output of generator 13, until the slope of the input signal has remained at a low level for a period sufficient to permit compensation of the accumulated errors. This overloading condition creates substantial distortion, and is one of the limitations of conventional delta modulation systems of the type shown in Fig. 1.

Figure 3:
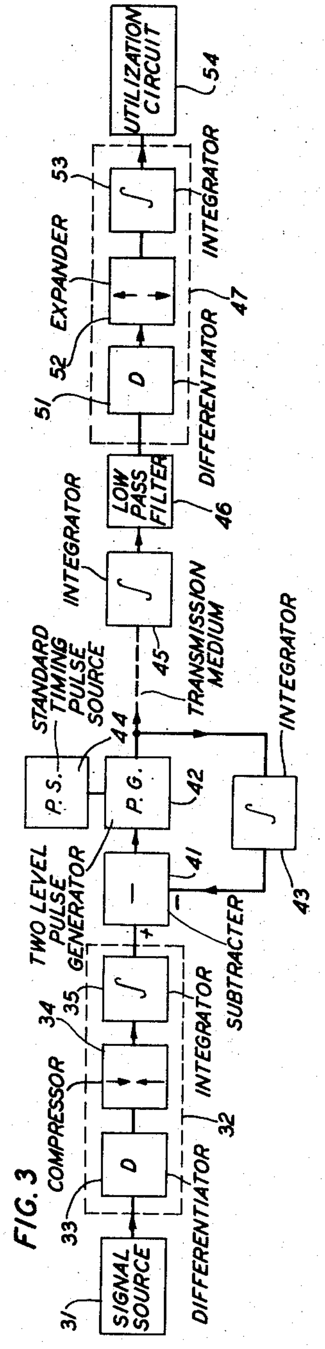
Fig. 3 is a block diagram of a delta modulation system including slope compression circuits, in accordance with the present invention.

The overloading and distortion noted above are overcome, in accordance with the principles of the present invention, by a slope companding system such as that which is included in Fig. 3. Fig. 3 shows, by way of example and for purposes of illustration, the source 31 which applies signals to the slope compressor 32, including the differentiator 33, the instantaneous amplitude compressor 34 and the integrator 35. After passing through the slope compressor 32, signals from the signal source 31 have the steep portions of their characteristics reduced in slope. The resulting signals are then applied to a conventional delta modulation encoder including the subtracter 41, the pulse generator 42 and the integrator 43. A standard timing pulse source 44 applies synchronizing pulses to the two-level pulse generator 42.

At the receiver, an integrator 45 and a low pass filter 46 are provided as in the delta modulation receiving terminal of Fig. 1. In addition, however, a slope expanding circuit 47 is provided which includes the differentiator 51, the instantaneous amplitude expander 52 and the integrator 53. This slope expansion circuit 47 restores the steep slopes of the original signals which were compressed by the slope compression circuit 32 at the transmission terminal. A suitable utilization circuit 54 is coupled to the output of the expander 47. In Fig. 3, the delta modulation encoding circuits may be of the same type as disclosed in Schouten et al. Patent 2,662,118 mentioned hereinabove. The differentiation and integration circuits may be conventional resistance-capacitance circuits, and may include sufficient amplification to restore the signal levels. The compression and expanding circuits may, for example, be those disclosed in an article by P. A. Reiling entitled "Companding in PCM," which appeared in the December, 1948 issue of the Bell Laboratories Record, volume XXVI, No. 12, pages 487 to 490, especially page 489.

Figure 4:
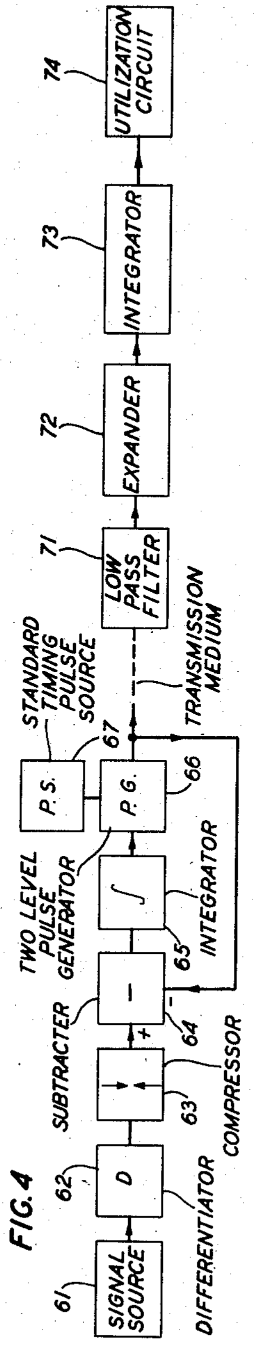
Fig. 4 is a simplified version of the circuit of Fig. 3.

A simplified version of the circuit of Fig. 3 is shown in the block diagram of Fig. 4. In Fig. 4, the output from the signal source 61 is applied to the differentiator 62. The differentiator output is compressed in circuit 63. The signals are then applied in turn to the subtracter 64, the integrator 65 and the two-level pulse generator 66. As in the circuits of Figs. 1 and 3, the output of the pulse generator 66 is timed by a suitable source of standard frequency pulses 67. At the receiving terminal of the delta modulation system shown in Fig. 4, the signals are applied to a low pass filter 71, an instantaneous amplitude expanding circuit 72, an integrating circuit 73 and a suitable utilization circuit 74.

In comparing the transmitting terminal of Fig. 4 with that of Fig. 3, it may be observed that one of the integrating circuits has been eliminated and that the position of the other integrating circuit has been shifted. Essentially, this means that the subtraction operation takes place before integration, and that a single integrating circuit 65 may be employed in the circuit of Fig. 4 instead of the two integrating circuits 43 and 35 which were used in Fig. 3.

Comparing the receiving terminal of Fig. 4 with that of Fig. 3, it may be noted that both a differentiator and an integrator are removed from the receiver circuit by a slight rearrangement of circuit units. At the receiver of Fig. 4, the low pass filter 71 now precedes the expander 72 and the integrator 73. By this arrangement, the differentiator 51 and the integrator 53 of Fig. 3 have been eliminated. In addition to the reduction of cost of the circuits in question, the elimination of the units mentioned has avoided signal distortion at the output circuit 74 which might otherwise be introduced.

Figure 5:
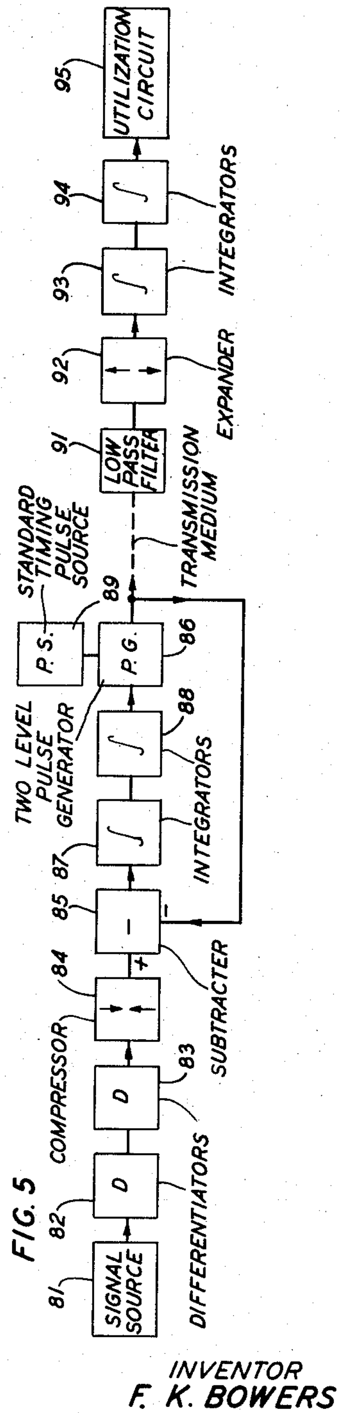
Fig. 5 is a circuit in accordance with the present invention in which slope companding is applied to a delta modulation system in which the transmitted pulses represent the second derivative of the original signals.

The circuit of Fig. 5 is quite similar to that of Fig. 4, and represents the application of certain principles of the invention to a delta modulation system in which pulses representing the second derivative of the signals rather than the first derivative are transmitted. Delta modulation systems of this type overload and introduce distortion when the rate of change of the slope is too large. Under these circumstances, a delta modulation system which compresses signals representing the second derivative of the original signals is employed. This is accomplished in Fig. 5 by applying signals from the source 81 to the successive differentiators 82 and 83, and then to the compressor 84. The signals from the compressor 84 are applied to the subtracter 85 together with pulses from the output of the pulse generator 86. The two integration networks 87 and 88 are inserted between the substractor 85 and the pulse generator 86. The usual standard source 89 of synchronizing pulses is connected to the pulse generator 86. The receiving circuit in the system of Fig. 5 is also comparable to the receiving circuit of Fig. 4. Specifically, it is made up of the low pass filter 91, the expander 92 and the two integration circuits 93 and 94 connected to a suitable utilization circuit 95. In the complete system of Fig. 4, therefore, second derivative companding is employed instead of the first derivative companding employed in the systems of Figs. 3 and 4.

In the delta modulation circuits of Figs. 1, 3, 4 and 5, the required bandwidth for the transmission of output pulses is given by the following expression:

$$B=\frac{f_r}{2}$$

where

B is the transmission bandwidth, and $f_r$ is the sampling rate, which is the frequency of output pulses from the standard timing pulse source such, for example, as source 14, 44 or 67.

Accordingly, the required bandwidth is directly proportional to the sampling frequency. When derivative companding is employed, however, the pulse repetition rate can be reduced somewhat, and the quality of signal transmission may still be improved. Thus, the present improvement may be used either to substantially improve the quality of the transmitted signals or to substantially reduce the required transmission bandwidth, or to improve both of these factors simultaneously to lesser degrees. By way of example, the typical 50 kilocycle bandwidth required for transmission of an audio signal by a conventional delta modulation system may be reduced to 30 kilocycles when derivative companding is employed in accordance with the principles of the present invention.

Figure 6:
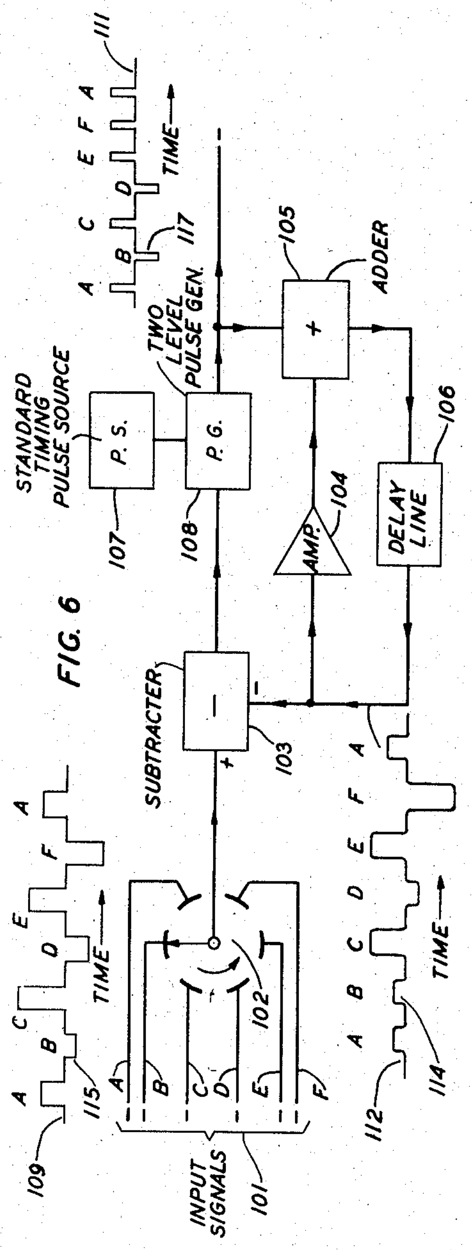
Fig. 6 illustrates a multiplex delta modulation transmission terminal.

Fig. 6 illustrates a multiplex delta modulation transmission terminal. A plurality of input signals are applied to the transmitter terminal at 101. Samples of the input signals 101 are obtained by the switching circuit indicated schematically by the commutator 102. In practice, the switching operation is performed electronically by a diode switching matrix such as that described in R. L. Carbrey application Serial No. 430,181 filed May 17, 1954.

The signal samples from the switching circuit 102 are applied to one input of the subtracter 103. The other input to the subtracter 103 is derived from the delay loop made up of the amplifier 104, the adder 105 and the delay line 106. In comparing Figs. 1 and 6, it may be noted that the units 104, 105 and 106 of the multiplex circuit of Fig. 6 correspond to the integration circuit 15 in the simpler form of delta modulator shown in Fig. 1.

In Fig. 1, the subtracter 12 compares the magnitude of the output from signal source 11 with that from integrator 15, and determines whether the pulse generator 13 produces a positive or a negative pulse. Similarly, the subtracter 103 in Fig. 6 compares the output from the switch 102 and the delay loop including units 104 through 106, and determines whether the pulse generator 108 produces a positive or a negative pulse. The standard pulse source 107 provides gating pulses to enable the pulse generator 108. The pulse source 107 is synchronized with the switching circuit 102 so that the sign of the subtracter pulse output is determined at approximately the mid-point of each pulse.

As mentioned above, the units 104 through 106 perform an integrating function. That is, the pulses associated with a particular one of the channels A through F are added in unit 105, and a pulse representing the algebraic sum of the output pulses associated with the specified channel is circulated in the delay loop. To illustrate this more clearly, representative pulse patterns are shown for various points in the circuit of Fig. 6. For example, pulse patterns such as that shown at 109 appear at the output of the sampling switch 102. At the output of the pulse generator 108, positive and negative pulses of equal amplitudes are produced as shown at 111. The pulses circulating in the delay loop made up of units 104 through 106 have the general form shown at 112. The time required for pulses to traverse the delay loop 104 through 106 is exactly equal to the time required for a complete cycle of the switching circuit 102. Thus, for example, the pulse representing the integrated output on channel B is indicated at 114 as being slightly positive. The present value of the pulse B, however, as indicated at 115, is slightly negative. The subtracter 103 has the pulses 114 and 115 applied to its inputs simultaneously. Because the value 115 is slightly less than the value indicated by the pulse 114, the subtracter 103 yields a negative indication, and the two-level pulse generator 108 produces a negative pulse 117. This in turn reduces the pulse 114 by combination of the pulse 117 with the pulse 114 in the adder 105. At the next cycle of the multiplex system, when the pulse B again returns to the substracter 103, the same comparison and pulse generation process is repeated. Accordingly, by the use of a circulating delay line, an integration circuit has been provided which stores the outputs of all of the input channels and also permits the use of a common substracter 103 and pulse generator 108.

Figure 7:
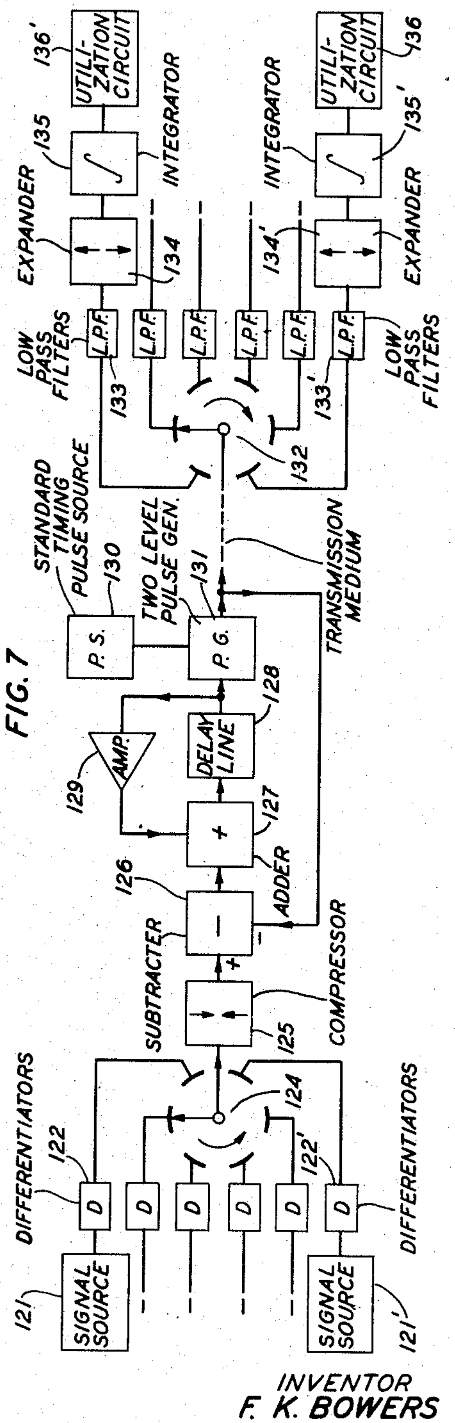
Fig. 7 is a block diagram of a complete multiplex delta modulation system including slope companding circuits.

The circuit of Fig. 7 bears the same relationship to Fig. 6 that the circuit of Fig. 4 bears to Fig. 1. More particularly, the companding function has been incorporated into the multiplex transmission system of Fig. 7. In Fig. 7, a plurality of signal sources 121 are connected through individual differentiators 122 to a switching circuit 124 corresponding to that indicated at 102 in Fig. 6. The output from the switching circuit 124 is applied to the instantaneous amplitude compressor 125, and then to the subtracter 126. As in the case of Fig. 6, the integrating function is performed by an adder, a delay line and an amplifier. In the circuit of Fig. 7, however, these units are designated 127, 128 and 129, respectively. In addition, the integration circuit 127 through 129 is located between the subtracter and the pulse generator, as in Fig. 4, rather than in the feedback loop. A standard pulse source 130, which is synchronized with the switching circuit 124, supplies gating pulses to the pulse generator 131. Signals from the two-level pulse generator 131 of Fig. 7 are transmitted to the switching network 132 at the receiver, which is operated in synchronism with the network 124. The signals are then applied to individual low pass filters 133, expanders 134 and integrators 135, which are connected in series with individual utilization circuits 136.

It is to be understood that the above-described arrangements are illustrative of the application of the principles of the invention. Numerous other arrangements may be devised by those skilled in the art without departing from the spirit and scope of the invention.

What is claimed is:

1. In a delta modulation encoder, an input circuit, an output circuit, a differentiator connected to said input circuit, a compression circuit connected to the output of said differentiator, a subtracter having one input connected to the output of said compression circuit and the other input connected to said output circuit, an integrator connected to the output of said subtracter, and two-level pulse generation means for receiving signals from said integrator and applying pulses to said output circuit.

2. In a delta modulation transmission system; a transmitter including an input circuit, an output circuit, a differentiator connected to said input circuit, a compression circuit connected to the output of said differentiator, a subtracter having one input connected to the output of said compression circuit and the other input connected to said output circuit, an integrator connected to the output of said subtracter, and two-level pulse generation means for receiving signals from said integrator and applying pulses to said output circuit, and a receiver including a low pass filter, an expander, an integrator and a utilization circuit connected in cascade.

3. In a delata modulation transmission system, a transmitter including an input circuit, an output circuit, first and second series connected differentiators connected to said input circuit, a compression circuit connected to the output of said second differentiator, a subtracter having one input connected to the output of said compression circuit and the other input connected to said output circuit, first and second integrators connected to the output of said subtracter, and two-level pulse generation means for receiving signals from said second integrator and applying pulses to said output circuit, and a receiver including a low pass filter, an expander, first and second integrators and a utilization circuit connected in tandem.

4. In a multiplex delta modulation encoder, a plurality of input circuits, an output circuit, a differentiator connected to each of said input circuits, switching means for sampling the signals from each of said differentiators, a common compression circuit connected to the output of said switching means, a subtracter having one input connected to the output of said compression circuit, and the other input connected to said output circuit, an integration circuit connected to the ouput of said subtracter, and two-level pulse generation means for receiving signals from said integration circuit and applying pulses to said output circuit.

5. A combination as defined in claim 4 wherein said integration circuit includes a feedback delay loop.

6. In a signal transmission system, a transmitter including a plurality of signal sources, means for differentiating the signals from each of said sources, switching means for sampling said differentiated signals, a common means for compressing the differentiated signals, and common encoding means for transmitting a multiplex pulse indication of the compressed differentiated signals, and a receiver coupled to the output of said encoding means, said receiver including another switching means synchronized with said first-mentioned switching means for demodulating said signals, and a low pass filter, an expander, and an integrator connected in cascade with each of the output leads from said switching means.

7. In a multiplex delta modulation transmission system, a transmitter including a plurality of signal sources, switching means for sampling the signals from said sources, and a common delta modulation encoder connected to said switching means, said encoder including a delay loop integration circuit, and a receiver coupled to receive signals from said transmitter, said receiver including a plurality of output circuits, means for integrating received signal pulses originating from each signal source, and another switching means synchronized with said first-mentioned switching means for associating signals originating at specific signal sources with specific output circuits.

8. In a delta modulation encoder, an input circuit, an output circuit, a differentiator coupled to said input circuit, a compression circuit coupled to the output of said differentiator, a comparison circuit having one input coupled to the output of said compression circuit and the other input directly coupled to said output circuit, an integrator directly coupled to the output of said comparison circuit, and binary signal generation means for receiving signals from said integrator and applying binary signals in successive time intervals to said output circuit.

9. In a delta modulation multiplex transmitter, a plurality of signal sources, switching means for sampling the signals from said sources, an output circuit, a single delta modulation encoding means for applying pulses to said output circuit during successive time intervals, means for applying pulse signals to said single encoding means representing for each source the difference between the sum of the previous output pulses for that source and the correspoding instantaneous value of the sampled signal from each source, said pulse applying means including a subtraction circuit coupled to said switching means, a delay line having a delay substantially equal to one sampling cycle of operation of said switching circuit, and means for connecting said subtraction circuit, said delay line and said single encoding means in a series loop.

UNITED STATES PATENTS

References Cited in the file of this patent

| | | |
|---|---|---|
| 2,530,538 | Rack | Nov. 21, 1950 |
| 2,605,361 | Cutler | July 29, 1952 |
| 2,617,879 | Sziklai | Nov. 11, 1952 |
| 2,632,058 | Gray | Mar. 17, 1952 |
| 2,636,081 | Feldman | Apr. 21, 1953 |
| 2,662,118 | Schouten et al. | Dec. 8, 1953 |
| 2,803,702 | Ville et al. | Aug. 20, 1957 |